United States Patent [19]

Brown

[11] Patent Number: 4,621,336

[45] Date of Patent: Nov. 4, 1986

[54] VISUAL DISPLAY OF TIME SCHEDULE IN A PROGRAMMABLE THERMOSTAT

[75] Inventor: Bernard T. Brown, St. Louis County, Mo.

[73] Assignee: Emerson Electric Co., St. Louis, Mo.

[21] Appl. No.: 651,098

[22] Filed: Sep. 17, 1984

[51] Int. Cl.⁴ .................. G05D 23/32; G06F 15/20
[52] U.S. Cl. .................. 364/557; 364/145; 236/46 R
[58] Field of Search .............. 364/557, 505, 144, 145, 364/146; 165/12; 236/46 R, 94; 350/336; 340/784, 752, 721; 368/72, 73, 109, 240

[56] References Cited

U.S. PATENT DOCUMENTS

| | | | |
|---|---|---|---|
| 4,129,847 | 12/1978 | Teichert | 337/301 |
| 4,200,910 | 4/1980 | Hall | 364/145 |
| 4,264,034 | 4/1981 | Hyltin et al. | 236/46 R |
| 4,272,836 | 6/1981 | Tamaru et al. | 368/74 |
| 4,298,946 | 11/1981 | Hartsell et al. | 364/557 |
| 4,300,199 | 11/1981 | Yohnis et al. | 364/557 |
| 4,386,649 | 6/1983 | Hines et al. | 165/12 |
| 4,567,557 | 1/1986 | Burns | 364/145 |

*Primary Examiner*—Errol A. Krass
*Assistant Examiner*—Daniel W. Juffernbruch
*Attorney, Agent, or Firm*—Paul A. Becker, Sr.

[57] ABSTRACT

An electro-optical display in a programmable electronic thermostat includes a plurality of selectively energized display elements which cooperate with a 24-hour time indicia to provide a continuous visual display of the time periods during which a specific programmed space temperature is to be maintained.

8 Claims, 6 Drawing Figures

|  | COM 0 | COM 1 | COM 2 | COM 3 |
|---|---|---|---|---|
| 1" | 25 | 26 | 27 | 28 |
| 2" | 29 | 30 | 31 | 32 |
| 3" | 33 | 34 | 35 | 36 |
| 4" | 37 | 38 | 39 | 40 |
| 5" | 41 | 42 | 43 | 44 |
| 6" | 45 | 46 | 47 | 48 |
| 7" | 6' | F1' | E1' | D1' |
| 8" | A1' | B1' | G1' | C1' |
| 9" | COL | F2' | E2' | D2' |
| 10" | A2' | B2' | G2' | C2' |
| 11" | — | F3' | E3' | D3' |
| 12" | A3' | B3' | G3' | C3' |
| 13" | 1 | 2 | 3 | 4 |
| 14" | 5 | 6 | 7 | 8 |
| 15" | — | C5' | E5' | A5' B5' F5' G5' |
| 16" | 9 | 10 | 11 | 12 |
| 17" | AN3 | AN2 | AN1 | AN4 |
| 18" | 13 | 14 | 15 | 16 |
| 19" | 17 | 18 | 19 | 20 |
| 20" | 21 | 22 | 23 | 24 |
| 21" | C4' | G4' | B4' | A4' |
| 22" | D4' | E4' | F4' | — |

VISUAL DISPLAY OF TIME SCHEDULE IN A PROGRAMMABLE THERMOSTAT

BACKGROUND OF THE INVENTION

This invention relates to visual displays in programmable electronic space thermostats which control operation of a heating and/or cooling system according to a programmed time-temperature schedule.

Thermostats having the capability of automatically switching from one level of temperature to be maintained in a space to another level at specific times, such thermostats sometimes referred to as set-back thermostats, generally require the user to perform some degree of programming or adjusting to establish a desired time-temperature schedule of operation. Once a set-back thermostat has been so programmed or adjusted, the user may easily forget the specific times and temperatures involved in the schedule, and thereafter simply rely on the visual display on the thermostat for such information.

In thermostats that are primarily electromechanical, the scheduled values of temperature, sometimes referred to as the setpoints, are generally set by a lever or knob which cooperates with an appropriate indicia of temperature values so as to enable the user to readily see, at a glance, the scheduled values of temperature. The scheduled values of times at which the levels of temperature are to be changed is also generally readily visible. For example, such thermostats often include a timer having a clock face with a plurality of tabs or pins attached to the outer perimeter thereof. Each such tab or pin, which includes a portion to mechanically effect the change in the level of temperature by operating a switch, for example, also includes a portion which cooperates with indicia on the clock face to visibly indicate the clock time at which such change occurs.

In thermostats that are primarily electronic, the time-temperature schedule is generally programmed by means of a key pad or slide switches. When slide switches are used, the scheduled times and temperatures are readily visible by simply looking at the slide switches and their cooperating indicia. When a key pad is used, the present scheduled temperature (setpoint) is generally continuously displayed in an electro-optical display, along with the present time and present sensed temperature. However, neither the values of the other scheduled temperatures nor the values of the scheduled times are continuously displayed. If the user wants to know, for any reason, what the programmed time-temperature schedule is, he must know what procedure to use to obtain this information and then must execute such procedure. Typically, at least one key must be depressed one or more times to effect a visible indication of the time-temperature schedule on a display. While such manipulation of a key or key pad is not necessarily difficult, it is inconvenient and it raises the possibility of accidentally touching the wrong key or operating a single key improperly, and thereby inadvertently changing other parameters of the time-temperature schedule.

When there are only two scheduled temperatures involved, it is believed unnecessary to continuously display both scheduled temperatures at the same time. That is to say, when only two temperatures values are involved, one of which is chosen to provide a level of comfort and the other to provide an energy savings, it is believed that these values, once chosen by the user, would thereafter generally be acceptable to the user and not be constantly adjusted. However, it is believed desirable that the time schedule be continuously displayed. For example, if the user unexpectedly spends a day at home or has late company, he may want to know exactly when the comfort level of temperature is programmed to prevail. When the time schedule is continuously displayed, the user can thus see the time schedule, at a glance, without any manipulation of any portion of the thermostat.

SUMMARY OF THE INVENTION

An object of this invention is to provide a generally new and improved optical display in a programmable electronic thermostat, which display continuously indicates the programmed time schedule.

In accordance with the present invention, a programmable electronic thermostat employs an electro-optical display in the form of an LCD (liquid crystal display) having a plurality of independently energizable display elements arranged contiguously on its perimeter. In the process of programming the thermostat for a desired time-temperature schedule, selected ones of the LCD elements are energized so that, in cooperation with a 24-hour indicia adjacent the elements, a 24-hour time schedule is established. Specifically, the energized elements visually indicate during what time periods a specific programmed temperature is to be maintained. After the thermostat is so programmed, the energized elements remain energized so that the time schedule is readily visible at a glance with no manipulation required of any portion of the thermostat.

The above-mentioned and other objects and features of the present invention will become apparent from the following description when read in conjunction with the accompanying drawings.

DESCRIPTION OF THE PREFERRED EMBODIMENT

Figure 1:
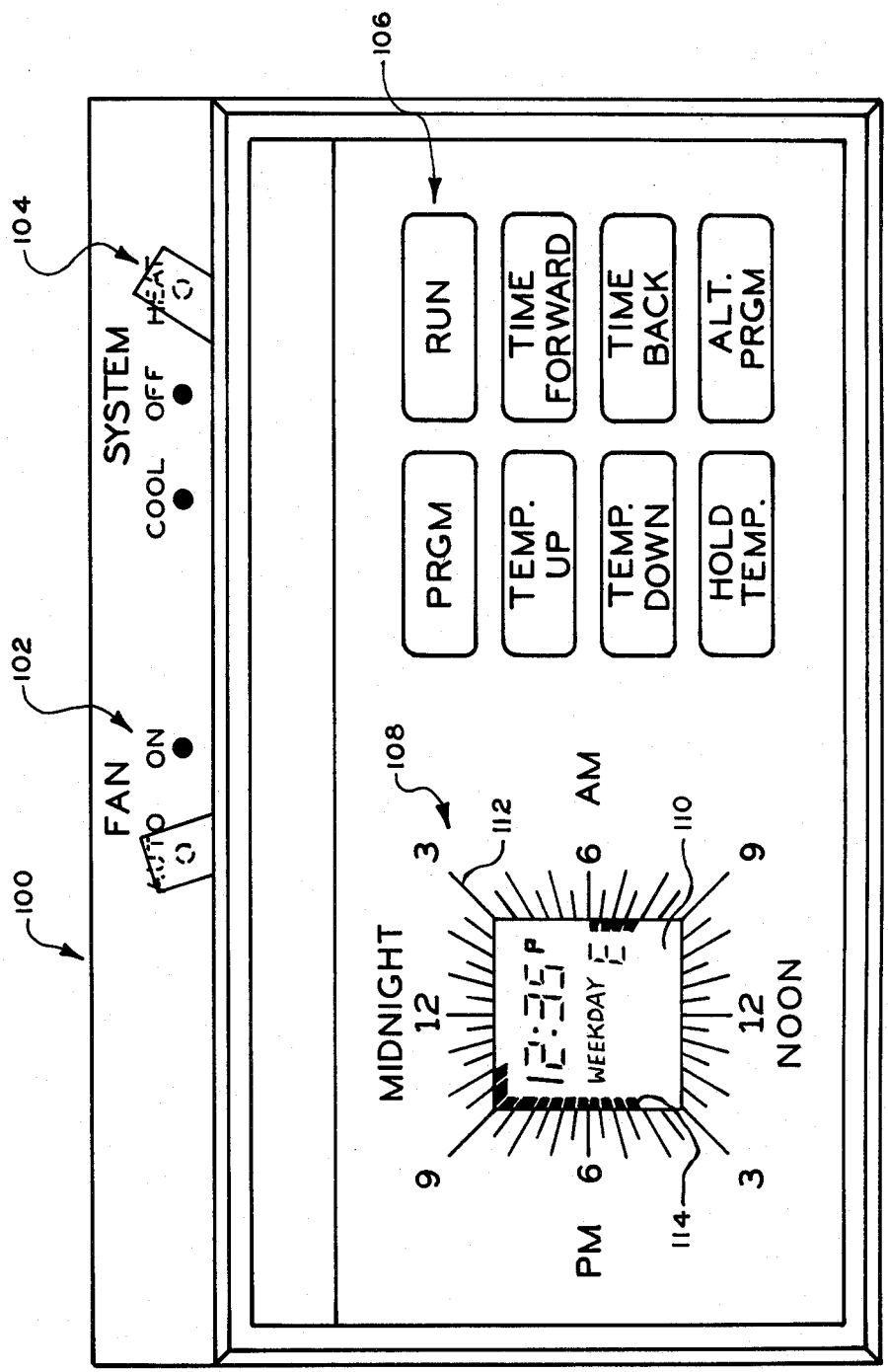
FIG. 1 is a front elevation view of a programmable electronic thermostat with an optical display constructed in accordance with the present invention.

Referring to FIG. 1, shown generally at 100 is a programmable electronic thermostat for use in a heating and cooling system. Thermostat 100 includes a fan selector switch 102 and a system selector switch 104. Also included is a key pad 106 and a display portion 108.

Display portion 108 comprises an electro-optical display in the form of a generally square-shaped LCD 110, and a surrounding indicia 112. As will be described hereinafter in more detail, LCD 110 is constructed so as to display the present room temperature value and alternately, the present 12-hour clock time in digital form followed by the letter "A" for A.M. and "P" for P.M., the program designation of WEEKDAY or WEEKEND, a display of AUTO when the changing between the WEEKDAY and WEEKEND programs is "automatic", the letter "C" when the present time is within a time period when a level of temperature considered to be the "comfort" level is to be maintained, the letter "E" when the present time is within a time period when a level of temperature considered to be the "economy" level is to be maintained, the letter "H" to indicate a "hold" temperature is in effect, the letter "O" to indicate a temporary "override" is in effect, and the letter "B" to designate "battery" operation or a low "battery" condition. Furthermore, LCD 110 is constructed so as to include a plurality of selectively energized display elements 114 on its periphery. Display elements 114, in cooperation with the adjacent indicia 112, provide a readily visible display so that the user can determine at a glance, without manipulating key pad 106, during what time period or periods the "comfort" level of temperature is to be maintained.

Figure 3:
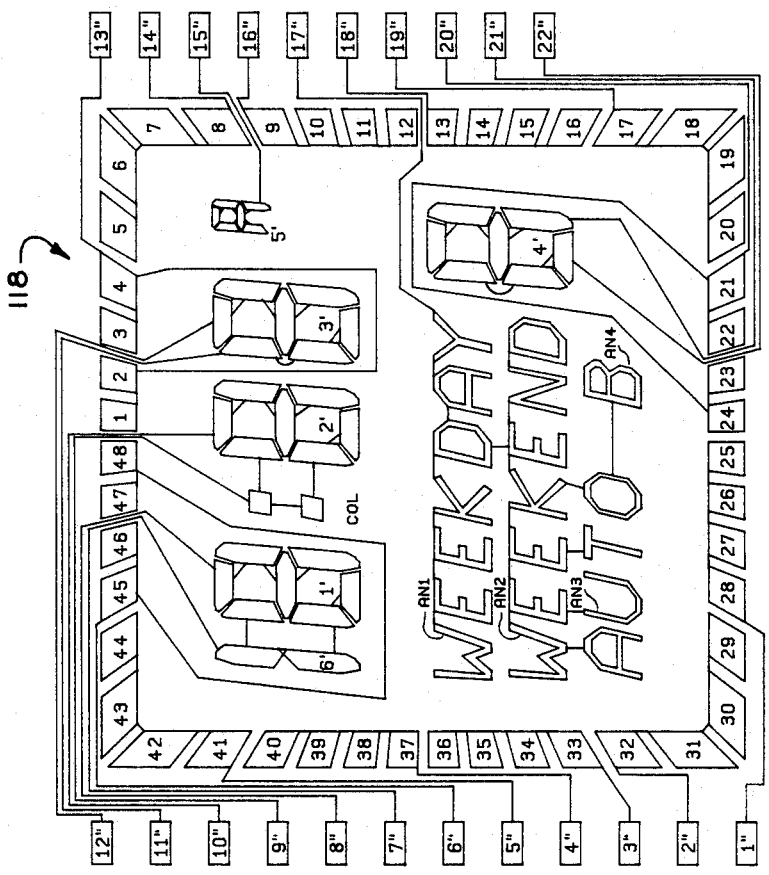
FIGS. 2 and 3 are partial plan views of the common and segment electrode portions, respectively, of an LCD incorporated in the optical display.
Figure 2:
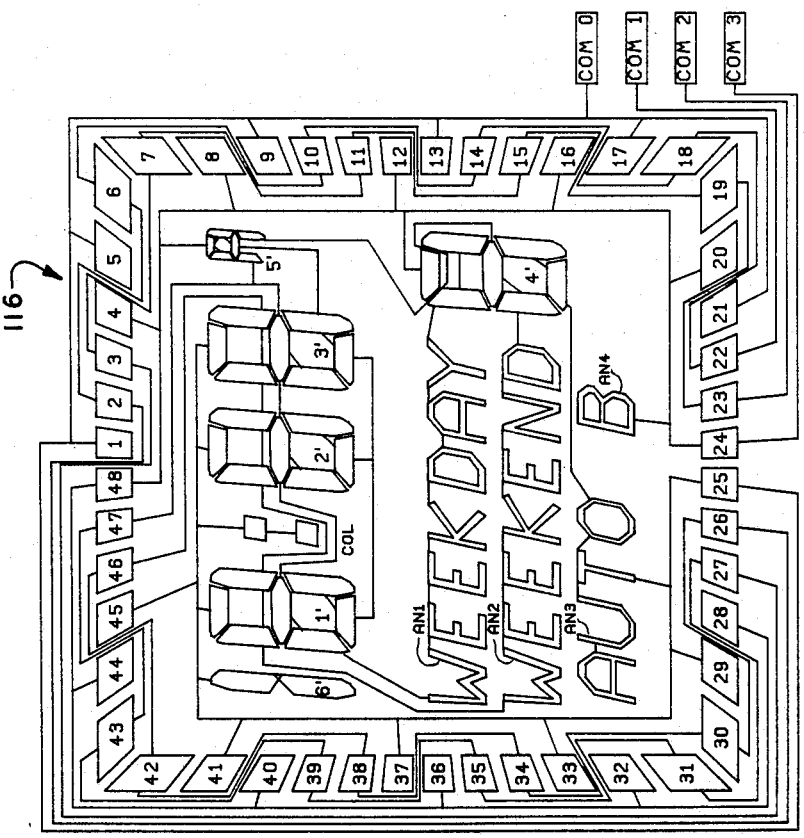

Referring to FIGS. 2 and 3, shown therein are the common (backplane) electrode portion 116 and the segment electrode portion 118, respectively, of LCD 110. As shown therein, the common and segment electrodes in the interior of LCD 110 are identified as 1', 2', 3', 4', 5', 6', COL, AN1, AN2, AN3, and AN4, and the electrodes on the perimeter of LCD 110 are identified 1 through 48. In the common electrode portion 116, all the electrodes of LCD 110 are selectively connected to pins identified as COM 0, COM 1, COM 2, and COM 3; in the segment electrode portion 118, all the electrodes are selectively connected to pins identified as 1" through 22".

Figures 4, 5:
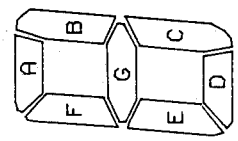
FIG. 4 is a table illustrating which common and segment electrode portions are required to be energized to define specific display elements of the LCD.
FIG. 5 is a plan view of a seven-segment digit of the LCD with each of the seven segments identified.

A display element is defined or "turned on" whenever the proper voltage appears between directly-opposed common and segment electrodes. The table of FIG. 4, in conjunction with FIGS. 2, 3, and 5 shows which pair combinations of pins of common electrode portion 116 and segment electrode portion 118 need to be energized to define specific display elements in LCD 110. For example, to obtain the visual display illustrated in FIG. 1, the following energizing the LCD 110 is required: pins COM 0 and 7" for defining the digit "1" at electrode 6'; pins COM 0 and 8", COM 1 and 8", COM 2 and 7", and COM 3 and 7" for defining the digit "2" at electrode 1'; pins COM 0 and 9" for defining the colon; pins COM 0 and 10", COM 1 and 10", COM 2 and 10", COM 3 and 10", and COM 3 and 9" for defining the digit "3" at electrode 2'; pins COM 0 and 12", COM 1 and 11", COM 2 and 12", COM 3 and 12", and COM 3 and 11" for defining the digit "5"at electrode 3'; pins COM 2 and 15", and COM 3 and 15" for defining the letter "P" at electrode 5'; pins COM 2 and 17" for defining the work "WEEKDAY" at electrode AN1; pins COM 0 and 22", COM 1 and 21", COM 1 and 22", COM 2 and 22", and COM 3 and 21" for defining the letter "E" at electrode 4', pins COM 0 and 3", COM 1 and 3", COM 2 and 3", COM 3 and 3", COM 0 and 4", COM 1 and 4", COM 2 and 4", COM 3 and 4", COM 0 and 5", COM 1 and 5", COM 2 and 5", and COM 3 and 5" for energizing electrodes 33 through 44, which energizing defines display elements 114 of FIG. 1 to indicate, in cooperation with indicia 112, a time period between 4:00 P.M. and 10:00 P.M.; and pins COM 0 and 18", COM 1 and 18", COM 2 and 18", and COM 3 and 18" for energizing electrodes 13, 14, 15, and 16, which energizing defines display elements 114 of FIG. 1 to indicate a time period between 6:00 A.M. and 8:00 A.M.

Figure 6:
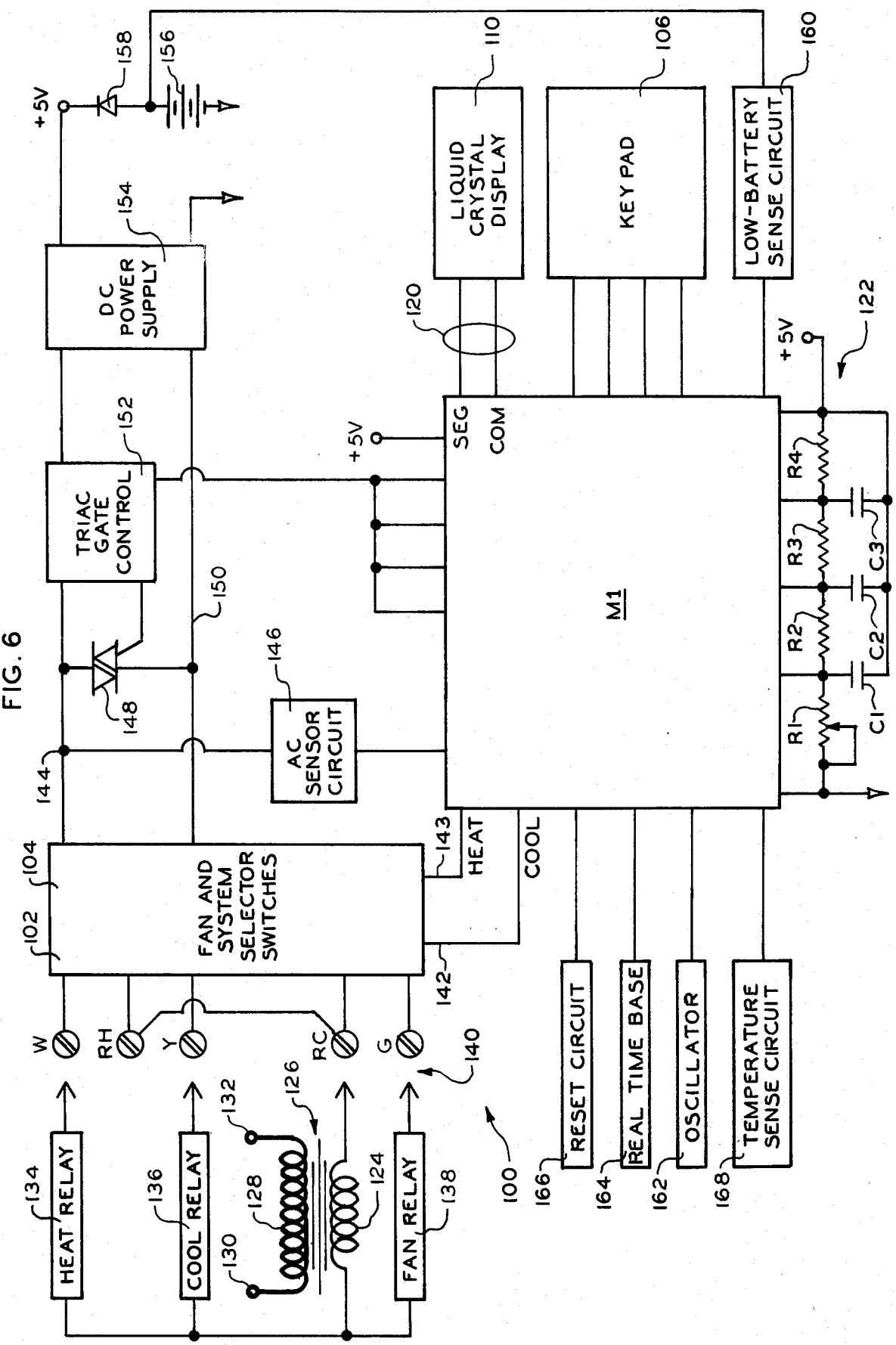
FIG. 6 is a schematic illustration, largely in block-diagram form, of a thermostat incorporating the present invention and shown connected to heating and cooling apparatus.

Referring to FIG. 6, thermostat 100 includes a programmable microcomputer M1 to which LCD 110 is connected. The connection therebetween is a multiplexed connection 120 which enables the selective energizing of directly-opposed common electrodes 116 and segment electrodes 118 to effect the defining of the display elements in LCD 110 according to the table of FIG. 4.

Microcomputer M1, an NEC μPD7502 in a preferred embodiment, includes an integral LCD controller/driver which supervises the timing required to effect multiplexing of LCD 110. Microcomputer M1 also includes bias voltage supply inputs to enable the establishment of the voltage levels required by the common electrodes 116 and segment electrodes 118, such inputs having external connections to a circuit network 122 comprising adjustable resistor R1, fixed resistors R2, R3, and R4, and capacitors C1, C2, and C3.

Key pad 106 is also connected to microcomputer M1 and includes a matrix keyboard having individual keys identified, as shown in FIG. 1, as PRGM, TEMP. UP, TEMP. DOWN, HOLD TEMP., RUN, TIME FORWARD, TIME BACK, and ALT. PRGM.

To facilitate a more complete understanding of the present invention, additional circuit components are illustrated in FIG. 6. These additional components, which form no essential part of the present invention, are briefly described below.

Thermostat 100 is energized by the secondary winding 124 of a transformer 126 having a primary winding 128 connected across terminals 130 and 132 of a conventional 120 volt alternating current power source. Transformer 126 also provides power to a heat relay 134, a cool relay 136, and a fan relay 138 which are connectable between secondary winding 124 and input terminals 140 of thermostat 100.

Fan selector switch 102 determines whether the fan relay 138 will be continuously on or automatically controlled by thermostat 100. System selector switch 104 determines whether thermostat 100 will control the heat relay 134, the cool relay 136, or neither. Information as to whether the system selector switch 104 is in the HEAT or COOL position is transmitted therefrom to microcomputer M1 by leads 142 and 143.

Thermostat 100 is so constructed that whenever transformer 126 is energized, power appears on a lead 144 therein. The presence of this AC power is sensed by an AC sensor circuit 146 which is connected between lead 144 and microcomputer M1.

Controlling energizing of the heat relay 134, cool relay 136, and fan relay 138, when fan selector switch 102 is in its "auto" position, is a triac 148 which is connected between power lead 144 and a return lead 150. Triac 148, in turn, is controlled by microcomputer M1 through a triac gate control 152.

Whenever transformer 126 is energized, a DC power supply 154 is energized to establish a +5 volt source for microcomputer M1. A battery 156 is connected through a controlled rectifier 158 to the +5 volt source to provide a source of power in the event of a loss of power from transformer 126. A lowbattery sense circuit 160 is connected between the positive side of battery 156 and microcomputer M1 and is effective to provide a specific signal to microcomputer M1 when battery 156 is not connected or when the voltage of battery 156 is below a certain value.

Also connected to microcomputer M1 are an oscillator 162 which cooperates with an internal oscillator for establishing the speed at which microcomputer M1 executes its program, a real time base 164, a reset circuit 166 for initializing microcomputer M1 and for protecting microcomputer M1 in the event of a brown-out condition, and a temperature sense circuit 168 for sensing space temperature and providing digital signals to microcomputer M1 indicative of the value of the sensed space temperature.

OPERATION

Microcomputer M1 is pre-programmed for a specific time-temperature schedule for both heating and cooling operation. Specifically, in the heating mode, the pre-programmed time-temperature schedule provides for a WEEKDAY program of a "comfort" temperature level from 6:00 A.M. to 8:00 A.M., an "economy" temperature level from 8:00 A.M. to 4:00 P.M., the "comfort" level from 4:00 P.M. to 10:00 P.M., and the "economy" level from 10:00 P.M. to 6:00 A.M., and a WEEKEND program of the "comfort" level from 8:00 A.M. to 11:00 P.M. and the "economy" level from 11:00 P.M. to 8:00 A.M. In the heating mode, the pre-programmed "comfort" temperature is 70° F. and the pre-programmed "economy" temperature is 62° F. In the cooling mode, the pre-programmed time schedule is the same as in the heating mode, but the pre-programmed "comfort" temperature is 78° F. and the pre-programmed "economy" temperature is 80° F. These pre-programmed time-temperature schedules are in the ROM (read only memory) of microcomputer M1 and are automatically loaded into the RAM (random access memory) of microcomputer M1 at reset. As will hereinafter be described, this pre-programmed time-temperature schedule can be used as is, or a different time-temperature schedule can be established by the user to suit his particular desires regarding time and/or temperature.

The procedure for user-programming of thermostat 100 is as follows.

1. Move the system selector switch 104 to HEAT or COOL depending upon whether the time-temperature schedule to be implemented is for the heating season or cooling season. LCD 110 displays 12:00 A.M., WEEKDAY, and the letter "H" (hold). Also, display elements 114 of LCD 110 will be energized to indicate the pre-programmed WEEKDAY time schedule of 4:00 P.M. to 10:00 P.M. and 6:00 A.M. to 8:00 A.M.
2. Press and release the key identified as PRGM. Hour segments with the colon and the letter "A" appear on the display. Press TIME FORWARD or TIME BACK keys until the correct value of the present time in hours, along with the letter "A" for A.M. or "P" for P.M., is displayed.
3. Press and release PRGM again. The colon and minute segments will appear on the display. Press TIME FORWARD or TIME BACK until the correct value of the present time in minutes is displayed.
4. If the pre-programmed WEEKDAY and WEEKEND time-temperature schedules are acceptable, press and release the RUN key. The display will then show the present time and sensed space temperature in an alternating fashion, WEEKDAY, the letter "C" if the present time is within a WEEKDAY time period during which the "comfort" temperature value is to be maintained or the letter "E" if the present time is within a WEEKDAY time period during which the "economy" temperature value is to be maintained, and display elements 114 will be energized to indicate the pre-programmed WEEKDAY time schedule of 4:00 P.M. to 10:00 P.M. and 6:00 A.M. to 8:00 A.M.
5. If it is desired to utilize the pre-programmed WEEKEND program as a repetitive 48-hour time duration program, press and hold, for at least 2 seconds, the ALT. PRGM key at the time the 48-hour WEEKEND program is to begin. The display will then show the present time and sensed space temperature in an alternating fashion, WEEKEND, the letter "C" if the present time is within the WEEKEND time period during which the "comfort" temperature value is to be maintained or the letter "E" if the present time is within the WEEKEND time period during which the "economy" temperature value is to be maintained, AUTO, which indicates that, thereafter, the program will "automatically" toggle between the 2-day WEEKEND schedule and the 5-day WEEKDAY schedule, and display elements 114 will be energized to indicate the pre-programmed WEEKEND time schedule of 8:00 A.M. to 11:00 P.M. If it is desired to utilize the pre-programmed WEEKEND program simply as an alternate program to the WEEKDAY program, press ALT. PRGM key momentarily, not holding it, at the time the WEEKEND program is to begin. The display will then indicate the time, temperature, WEEKEND, and letters "C" and "E" as above, but not the word "AUTO". The WEEKEND program will then remain in effect until the ALT. PRGM key is again pressed, at which time the WEEKDAY program will again begin. If it is desired not to use the WEEKEND schedule at all, the ALT. PRGM key is not manipulated, and the WEEKDAY schedule remains in effect continuously.

If the pre-programmed time-temperature schedule is not acceptable, the user can readily modify the schedule as described below.

Assume, for example, that a desired schedule of operation during the heating season is a "comfort" temperature of 68° between 5:30 A.M. and 8:30 A.M. Monday through Friday, between 5:00 P.M. and 10:30 P.M. Monday through Thursday, between 5:00 P.M. and 11:30 P.M. on Friday, between 9:00 A.M. and 11:30 P.M. on Saturday, and between 9:00 A.M. and 10:30 P.M. on Sunday, with an "economy" temperature of 60° at all other times. The procedure for user-programming of such a time-temperature schedule is as follows.

1. Move the system selector switch 104 to HEAT, and manipulate the PRGM and TIME FORWARD and TIME BACK keys as previously described, to establish the present time.
2. Press and release PRGM again. Electrode 2' and 3' of LCD 110 will display the pre-programmed "comfort" temperature value of "70", electrode 5' displays the parameter "°" (degrees), and electrode 4' displays the letter "C" which indicates that the displayed temperature value is the "comfort" value, press TEMP. DOWN until electrodes 2' and 3' display the desired "comfort" temperature value of "68".
3. Press and release PRGM again. Electrode 2' and 3' of LCD 110 will display the pre-programmed "economy" temperature value of "62", electrode 5' displays "°" (degrees), and electrode 4' displays the letter "E" which indicates that the displayed temperature value is the "economy" value. Press TEMP. DOWN until electrodes 2' and 3' display the desired "economy" temperature value of "60".

4. Press and release PRGM again. LCD 110 displays 6:00 A.M., which is the pre-programmed start time of the first "comfort" period, WEEKDAY, and display elements 114 to indicate the pre-programmed "comfort" temperature level time periods of 6:00 A.M. and 8:00 A.M. and 4:00 P.M. to 10:00 P.M. Also, the electrode 13 of LCD 110, which electrode defines the 30-minute time span between 6:00 A.M. and 6:30 A.M., begins to flash or blink at approximately 4 Hz. This flashing electrode can be regarded as a curser. Press the TIME BACK key. As soon as this key is depressed, the digital time display begins to change or roll back in 30-minute increments at a rate of approximately 2 Hz. Concurrently, the flashing electrode or curser begins to advance counterclockwise around the peripheral electrodes of LCD 110, starting with electrode 12. If an electrode is "off" during this advance, it will be "turned on"; if an electrode is "on", it will be "turned off". Since the desired start time of the first "comfort" period is to be 5:30 A.M., release the TIME BACK key as soon as the digital display shows 5:30 A.M. At this time, electrode 13 is again firmly "on", as are electrodes 14, 15, and 16, and electrode 12, which defines the 30-minute time span between 5:30 A.M. and 6:00 A.M., is flashing.

5. Press and release PRGM again. LCD 110 displays 8:00 A.M., which is the pre-programmed finish time of the first "comfort" period, WEEKDAY, and the same display elements 114 as in the step immediately above except that electrode 12 is now firmly "on", along with electrodes 13, 14, and 15. Also, electrode 16, which electrode defines the 30-minute time span between 7:30 A.M. and 8:00 A.M., begins to flash. Press the TIME FORWARD key. This causes the digital time display to roll forward. Concurrently, the curser begins to advance clockwise around the peripheral electrodes of LCD 110, starting with electrode 17. Since the desired finish time of the first "comfort" period is to be 8:30 A.M., release the TIME FORWARD key as soon as the digital display shows 8:30 A.M. At this time, electrode 16 is again firmly on, and electrode 17, which defines the 30-minute time span between 8:00 A.M. and 8:30 A.M., is flashing.

6. Press and release PRGM again. LCD 110 displays 4:00 P.M., which is the pre-programmed start time of the second "comfort" period, WEEKDAY, and display elements 114 to indicate the newly-programmed first "comfort" period of 5:30 A.M. to 8:30 A.M., and display elements 114 to indicate the pre-programmed second "comfort" period of 4:00 P.M. to 10:00 P.M. Also, electrode 33, which defines the 30-minute time span between 4:00 P.M. and 4:30 P.M., begins to flash. Electrode 17, caused to flash in the step immediately above, is now firmly "on". Press the TIME FORWARD key. This causes the digital time display to roll forward and the curser to begin advancing clockwise, starting with electrode 34. Since the desired start time of the second "comfort" period is 5:00 P.M., release the TIME FORWARD key as soon as the digital display shows 5:00 P.M. At this time, electrode 35, which defines the 30-minute time span between 5:00 P.M. and 5:30 P.M., is flashing. It is noted that electrodes 33 and 34, which were "on", are now "off".

7. Press and release PRGM again. LCD 110 displays 10:00 P.M., which is the pre-programmed finish time of the second "comfort" period, WEEKDAY, and the same display elements 114 that existed at the end of the step immediately above except that electrode 35 is again firmly "on", and electrode 44, which defines the 30-minute time span between 9:30 P.M. and 10:00 P.M., begins to flash. Press the TIME FORWARD key. This causes the digital time display to roll forward and the curser to begin advancing clockwise, starting with electrode 45. Since the desired finish time of the second "comfort" period is 10:30 P.M., release TIME FORWARD as soon as the digital display shows 10:30 P.M. At this time, electrode 44 is again firmly "on", and electrode 45, which defines the 30-minute time span between 10:00 P.M. and 10:30 P.M., is flashing.

8. Press and release PRGM again. LCD 110 displays 8:00 A.M., which is the pre-programmed start time of the single "comfort" period of the "weekend" schedule, WEEKEND, and display elements 114 which indicate the pre-programmed "comfort" period of 8:00 A.M. to 11:00 P.M. This "weekend" schedule is changed, using the same method as described above, to provide a "comfort" period of 9:00 A.M. to 11:30 P.M.

9. Press and release the RUN key. The display of LCD 110 is then the same as previously described for the display initiated by pressing the RUN key except that display elements 114 indicate the new "comfort" periods of 5:30 A.M. to 8:30 A.M. and 5:00 P.M. to 10:30 P.M.

10. On the first occurring Friday, any time between 5:00 P.M. and 10:30 P.M., press and hold, for at least 2 seconds, the ALT. PRGM key. The display of LCD 110 is then the same as previously described for the display initiated by pressing the ALT. PRGM key for the AUTO condition except that display elements 114 indicate the new "comfort" period of 9:00 A.M. to 11:30 P.M. It is noted that, as previously described, the program will automatically revert back to the WEEKDAY program 48 hours after the start of the WEEKEND program. Therefore, on Sunday evening, at a time between 5:00 P.M. and 10:30 P.M. determined by exactly when the 48-hour WEEKEND schedule was initiated, the program reverts back to the WEEKDAY program.

Thermostat 100 is also user-programmable to provide a temporary deviation from the established time-temperature schedule. Assume, for example, that it is desired to raise the space temperature for a few hours. To accomplish this, press and hold the TEMP. UP key. If the present time is within the "economy" period, the "economy" temperature value is displayed; if the present time is within the "comfort" period, the "comfort" temperature value is displayed. After 1 second, the displayed temperature value changes or rolls up. When the desired temperature value is reached, release the TEMP. UP key. The display of LCD 110 then reverts back to the same as it was previous to this manipulation except that electrode 4' of LCD 110 displays the letter "O" instead of "C" or "E", the letter "O" indicating temporary "override". Thermostat 100 will then control with this higher temperature setpoint until the next "economy" or "comfort" period begins. Since LCD 110 displays the present time and the time schedule, the user can readily see when the temporary override condition will terminate. The procedure for lowering the setpoint temperature is the same as above except the TEMP. DOWN key is used, causing the displayed temperature values to roll down.

In the above example, the temporary override condition may terminate too soon or too late due to the present time being too close to or too far from, respectively, the time-scheduled change between the "economy" and "comfort" temperature levels. Due to the visual display of the time schedule, such a possible premature or late termination is readily discernible. If it is determined that such a premature or late termination would occur, press and release the HOLD TEMP. key either before or after manipulating the TEMP. UP or TEMP. DOWN key. Electrode 4' of LCD 110 then displays the letter "H" indicating that thermostat 100 is in a "hold" mode. Under this condition, thermostat 100 will then continuously control to the new temporary setpoint. When it is desired to return to the programmed time-temperature schedule, press and release the RUN key. It is noted that the "hold" mode can therefore provide a temporary deviation from the programmed time-temperature schedule for any desired length of time.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

I claim:

1. In a programmable thermostat having digital memory means for storing a time-temperature schedule defining two different temperatures to be maintained during different time periods in a 24-hour time span, the improvement comprising display means including 24-hour time span indicia and an electro-optical display, said electro-optical display including a plurality of display elements arranged contiguously on its perimeter and adjacent to said time span indicia, each of said display elements, in cooperation with said time span indicia, representing a specific duration of time, said display elements being selectively energized in accordance with the stored time-temperature schedule such that those of said display elements that are energized provide for a continuous visual indication of the time periods during which one of the two stored temperatures is to be maintained.

2. The thermostat claimed in claim 1 wherein said thermostat is pre-programmed to effect said selective energizing of said contiguously arranged display elements so as to effect a visual display of one or more pre-programmed time periods during which said one of the two stored temperatures is to be maintained, said thermostat further including means for changing said one or more pre-programmed time periods, said means for changing including means for displaying the start time and finish time of said one or more pre-programmed time periods in digital form in said electro-optical display and for changing said displayed start and finish times so as to establish new start and finish times, and selected ones of said contiguously arranged display elements being energized or de-energized concurrently with said changing of said displayed start and finish times so as to effect a visual display of one or more new time periods during which said one of the two stored temperatures is to be maintained.

3. The thermostat in claim 1 wherein the stored time-temperature schedule comprises a 5-day weekday schedule and a 2-day weekend schedule, and wherein said electro-optical display includes energizable display elements for indicating present time and which of said schedules is in effect at said indicated present time.

4. The thermostat claimed in claim 3 further including means for enabling said 5-day weekday schedule and said 2-day weekend schedule to automatically follow each other, and said electro-optical display including energizable display elements for indicating said automatic operation.

5. The thermostat claimed in claim 1 wherein said electro-optical display includes energizable display elements for indicating present time and which of said two stored temperatures is in effect at said indicated present time.

6. The thermostat claimed in claim 1 further including means for temporarily deviating from the stored time-temperature schedule, and said electro-optical display includes energizable display elements for indicating present time and that said deviation is in effect at said indicated present time.

7. The thermostat claimed in claim 1 wherein said electro-optical display comprises a liquid crystal display.

8. The thermostat claimed in claim 1 wherein each of said plurality of selectively energized display elements represents a one-half hour time period.

* * * * *